United States Patent Office 3,053,801
Patented Sept. 11, 1962

3,053,801
SUSPENSION POLYMERIZED VINYL HALIDE POLYMER CONTAINING A COPOLYMER OF VINYL ACETATE AND A MONO-OLEFINICALLY SUBSTITUTED LACTAM, AND METHOD OF MAKING
Robert E. Bingham and Charles W. Beringer, Cuyahoga Falls, Ohio, assignors to The General Tire & Rubber Company, Akron, Ohio, a corporation of Ohio
No Drawing. Filed Aug. 25, 1959, Ser. No. 835,851
13 Claims. (Cl. 260—45.5)

This invention relates to the polymerization of vinyl halide monomers. More particularly, it relates to a novel method for the suspension polymerization of vinyl monomers such as vinyl chloride and vinyl chloride-vinyl acetate monomeric mixtures, to the novel compositions obtained thereby, and to novel products employing these compositions.

In the coating of tin cans utilizing copolymers of vinyl chloride and vinyl acetate the coating obtained must be continuous and not readily attacked by water. Many suspension polymers cannot be used for such coatings since the conventional protective colloids which are needed during polymerization create points in the coating that are more readily attacked by water than the base polymer. Further, higher temperatures must be used to process polymers made with conventional colloids, since these colloids have high softening points and do not permit the polymer to properly flux at normal polymer fusing temperatures. In other words, the difficulty that arises by trying to process polymers with a coating of a protective colloid is that the resin does not fuse adequately and therefore the filler binding ability of the resin is impaired. The result of not binding the filler properly is to obtain poor physical characteristics of the fabricating plastic.

Moreover, in many instances the viscosity and flow (as powder) of the conventional suspension polymers are not adequate, particularly for the manufacture of articles such as phonograph records or floor tile. Furthermore, organic solutions of these suspension polymers containing the conventional colloids exhibit haze or gel or are not clear. Another difficulty presented by the conventional colloids is that they do not make blotter-type resins of high conversion.

Accordingly, it is a primary object of the present invention to avoid the difficulties alluded to above and to provide a method for polymerizing vinyl halide monomers to obtain polymers which exhibit improved coating characteristics, viscosity and flow and, when dissolved in organic solvents, will produce essentially clear liquids free of gel and/or haze.

Another object of this invention is to provide a method for suspension polymerizing vinyl halide monomers, such as vinyl chloride or mixtures of vinyl chloride and vinyl acetate, to high conversion and to obtain polymers having improved coating properties, viscosity, and flow (as powder) and which will provide organic solvent solutions which are clear and free of gel.

Still another object is to provide a vinyl halide polymer exhibiting improved coating properties, flow and viscosity and which, when dissolved in organic solvents, provides clear and haze-free liquids.

A further object is to provide an organic solution of a suspension polymerized vinyl halide polymer characterized by being clear and free of gel and/or haze and capable of providing continuous water resistant films.

A still further object is to provide an article of manufacture having a water resistant coating of a suspension polymerized vinyl halide polymer which is clear and continuous.

These and other objects and advantages of the present invention will become more apparent to those skilled in the art from the following detailed description and examples.

According to the present invention it has been discovered that vinyl halide monomers can be suspension polymerized in the presence of from about 0.01 to 4% by weight of a colloid which is substantially soluble in water and in many organic solvents and which is a copolymer of at least one monoolefinic substituted lactam having from 4 to 7 carbon atoms in the lactam ring and vinyl acetate. These colloids are soluble or at least substantially soluble in water so that they afford their protective colloidal properties to the polymers as they are formed in the aqueous suspension system. Yet, polymers containing these colloids will dissolve in organic solvents to form gel and/or haze free solutions. They, also, can be fused into films which are free of pinholes and which, unexpectedly, are water resistant or not attacked by water. They, further, are useful in making blotter resins of high conversions.

THE COLLOID

Examples of useful lactams to employ in making the colloid are monoolefinic substituted lactams like 1-vinyl-2-pyrrolidone,
1-allyl-2-pyrrolidone,
1-vinyl-3pyrrolidone,
1-vinyl-3-methyl-2-pyrrolidone,
1-vinyl-3-propyl-2-pyrrolidone,
5-vinyl-2-pyrrolidone,
3-allyl-2-pyrrolidone,
1-vinyl-2-piperidone,
1-vinyl-3-piperidone,
1-vinyl-3-methyl-5-ethyl-2-piperidone,
6-vinyl-3-methyl-2-piperidone,
1-propyl-3-vinyl-2-piperidone,
1-butenyl-3-piperidone,
1-vinyl-2-suberone-isoxime,
1-allyl-2-suberone-isoxime,
1-amyl-2-vinyl-3-suberone-isoxime, and the like and mixtures thereof.

As shown above the hydrogen atoms attached to the carbon atoms of the lactam ring can be substituted by one or more, up to the total possible number of carbon valences available, with a lower alkyl radical such as methyl, ethyl, propyl, butyl, isobutyl, amyl, hexyl and the like and mixtures thereof. Moreover, the oxygen atom does not need to be attached in the 2 position but can be attached to —3, 4, 5 or any other carbon on the ring. Likewise, the vinyl, allyl, butenyl, hexenyl, or other lower alkenyl group does not need to be attached to the nitrogen atom but can be attached to one of the oxygen free carbon atoms of the ring and the remaining nitrogen valence can be satisfied by a hydrogen atom or by one of the lower alkyl radicals mentioned above.

It, thus, is seen that the lactams can have the following general type of structures:

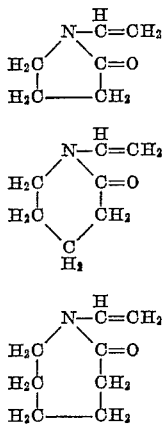

and

The generic formula is

where R is a lower alkyl or alkenyl substituted or unsubstituted saturated hydrocarbon chain of from 4 to 7 carbon atoms and R' is hydrogen or a lower alkyl or alkenyl radical as described above.

Lactams are well known materials and can be made by a number of methods. One method is to react an unsaturated amine with a halogenated carboxylic acid to get a secondary amine which then is heated to condense the amine with itself to form the lactam.

For example:

(1)

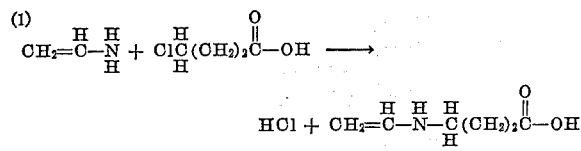

and (2)

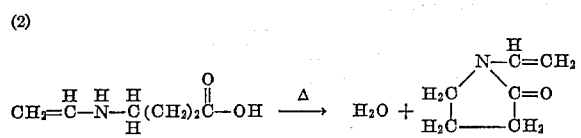

Lactams, also, may be obtained by the Beckmann rearrangement of alkenyl substituted cyclic ketoximes.

It is preferred to use a substituted pyrrolidone having the formula

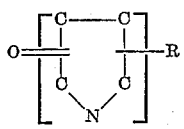

where R is an alkenyl radical having from 2 to 6 carbon atoms and is attached to one of the atoms of the group consisting of C and N of the pyrrolidone ring, O is attached to a carbon atom other than that to which R is attached, and the remaining valences on the carbon and nitrogen atoms are satisfied by radicals selected from the group consisting of hydrogen and the lower alkyl radicals of from 1 to 6 carbon atoms and mixtures thereof.

The lactam monomer is then copolymerized with vinyl acetate. The lactam monomer and vinyl acetate are polymerized by methods well known to the art such as by suspension polymerization, by emulsion polymerization, by polymerization in solvents, or in bulk, using catalysts, emulsifiers, chain transfer agents and the like. In general, the polymeric colloid contains the lactam monomer and the vinyl acetate monomer in the relative amounts of from about 1.0 to 0.2 mole of the lactam and from 0.2 to 1.4 moles of the copolymerizable vinyl acetate. Preferred polymers are those colloids containing from about 70 to 30% by weight of vinyl pyrrolidone and the balance vinyl acetate. In the colloid copolymer the lactam groups and the vinyl acetate monomer groups may alternate, may be randomly disposed or may be in the form of blocks. The average molecular weight of the colloid copolymer will vary over a wide range of from about 1,000 to 500,000 or more.

The polymeric colloids are miscible or dissolve in many solvents such as benzoyl alcohol, diacetone alcohol, tetrahydrofuran, acetone, methyl ethyl ketone, methyl isobutyl ketone, benzene, toluene, xylene and the like and mixtures thereof.

The polymeric colloid is used in amounts of from about 0.01 to 4% by weight, preferably from about 0.1 to 2.0% by weight, based on the weight of the suspension polymers obtained or on the total weight of the monomers charged to the suspension polymerization system.

THE SUSPENSION POLYMER

Monomers to be suspension polymerized can be any polymerizable vinyl halide monomer, including mixtures of these monomers, such as vinyl fluoride, vinyl chloride, vinyl bromide, vinylidene fluoride, vinylidene chloride, vinylidene bromide, or a copolymer of a major (total) amount of one or more of these vinyl halide monomers and a minor amount, preferably not over 15%, of at least one copolymerizable monomer having from one to two $H_2C=C<$ groups. Examples of monomers copolymerizable with the vinyl halide monomers in minor amounts are vinyl acetate, allyl alcohol, 3-butene-1-ol, phenyl vinyl ether, allyl acetone, diallyl phthalate, diallyl malonate, diallyl maleate, diallyl phthalate, divinyl ether, trichlorofluoroethylene, diallyl ether, acrylonitrile, methacrylonitrile, chloroacrylonitrile and the like and mixtures thereof. Preferred are monomeric mixtures comprising a major amount of at least one monomer of the group consisting of vinyl chloride, vinyl fluoride and vinyl bromide with a minor amount of a copolymerizable monomer other than these vinyl halides, such as one of the other monomers mentioned above. Even more preferred are polymers prepared from vinyl chloride, or a major amount by weight of vinyl chloride and a minor amount of vinyl acetate, for example, a polymer of from about 86 to 98% by weight of vinyl chloride and from about 14 to 2% by weight of vinyl acetate. The vinyl halide monomers have the formula

where $x$ is fluorine, chlorine or bromine and $y$ is hydrogen, fluorine, chlorine or bromine.

In suspension polymerization, the polymerizable monomers are charged to the reactor and polymerized in the presence of a large volume of water which preferably is deionized. In general, there is used about 1 part by weight of a monomeric mixture to 2 to 3 parts of water, although these amounts can be varied somewhat. The colloid can be added at the time the monomers are added or whenever convenient before polymerization.

Catalysts are generally used in the reaction and can be any catalyst which will effect polymerization, such as lauroyl peroxide, benzoyl peroxide and the like and mixtures thereof. Minor amounts of chain transfer agents or buffers can be added if desired. Examples of such agents are sodium bicarbonate, lead stearate, calcium stearate, ethylene trichloride (which is preferred) and the like. Heat is applied as necessary to start or maintain the reaction. It can be obtained by heating the water first and pumping it to the reactor so that the polymerization mixture initially has a temperature of about 120 to 140° F. The heat of reaction will keep the polymerization going until a conversion of 85 to 90% is obtained when polymerization generally ends. It is preferred to stir or agitate the mixture during polymerization to obtain the best particle size. If desired, the polymerization can be short-stopped prior to completion by adding a short-stopping agent such as diisopropyl benzene monohydroperoxide, tertiary butyl hydroperoxide, dimazine and so forth.

While this invention is particularly concerned with the suspension polymerization of vinyl halide polymers, the colloids disclosed herein can be employed in emulsion polymerization or solvent polymerization and in mass or bulk polymerization. The method of the present invention employing suspension polymerization with the copolymeric colloids, provides polymers of high conversion, 90% or better, and which are obtained at a low enough temperature that sufficiently high intrinsic viscosities (M.W.) are realized.

The vinyl halide polymers obtained according to the present invention can be plasticized with well known plasticizers such as dioctyl phthalate, tricresyl phosphate, the nonmigratory polyester plasticizers and others well known to the art. Stabilizers, antidegradants (antioxidants), fillers, rubbers, resins, pigments, dyes, fungicides and other compounding ingredients can be mixed and blended with these polymers as is customary in the art.

The resulting polymers in minor amounts can be dissolved in organic solvents and used for solution coating of or casting on cans, fiber containers, cardboard boxes, and the like. The polymers can be made into films or sheets for packaging purposes (bread wrappers), shower curtains and the like; can be printed with decorative colors and used as wall coverings; can be used as a backing material in the manufacture of pressure sensitive adhesive tapes; can be calendered onto woven or non-woven fabric of synthetic or natural fibers to make upholstery material, luggage etc. Also, the vinyl halide polymers of this invention, particularly the vinyl chloride-vinyl acetate copolymers, are particularly useful in making floor tiles, phonograph records and coating solutions. For example, a vinyl chloride-vinyl acetate copolymer containing a minor amount of the polymeric colloid at 20% by weight solids can be dissolved in a 50–50 methyl ethyl ketone-toluene solvent mixture and dipped or sprayed onto metallic (steel) beer can units having a coating of tin and a layer of phenolic resin on the tin. The vinyl halide resin after evaporation of solvent forms a continuous coating which is free of pinholes, resistant to water and adherent to the phenolic layer. However, the vinyl halide resin composition can be sprayed directly on the tin coating to provide useful results.

The following examples will serve to illustrate the invention with more particularity to those skilled in the art:

*Example I*

Vinyl chloride and vinyl acetate were suspension polymerized in water containing lauroyl peroxide, trichloroethylene and a lactam colloid of a copolymer of 50% 1-vinyl-2-pyrrolidone and 50% vinyl acetate (PVP–VA copolymer E–535 having a K value of 30–50 and made by The General Aniline and Film Corp.). The temperature was 140° F., the reaction time was continued until a pressure of 30 p.s.i.g. was obtained, and the mixture was stirred with a propeller type mixer at 300 r.p.m. Two runs (A and B) were made. The ingredients in parts by weight are shown below.

| Ingredients: | Parts by weight |
|---|---|
| Vinyl chloride, dist | 83 |
| Vinyl acetate, H grade | 17 |
| Water deionized | 200 |
| Lauroyl peroxide | 0.12 |
| Trichloroethylene | 2.0 |
| Polymeric lactam colloid (50% solution in anhydrous ethanol) | 25 |

A similar run (C) was made except that the lactam colloid was replaced with polyvinyl alcohol as a colloid. The resulting polymers were tested and compared with a solution polymerized vinyl chloride-vinyl acetate copolymer (D). The results obtained are shown in Table I, below:

TABLE I

| Run | A | B | C | D |
|---|---|---|---|---|
| (Intrinsic Viscosity at 25° C.) | 0.48 | 0.51 | 0.47 | 0.51 |
| Percent Vinyl Acetate | 13.5 | 12.6 | 13.4 | 13.2 |
| Wet Sieve Analysis: | | | | |
| on 40 | 0 | 0 | 0 | 0 |
| on 100 | 51 | 23 | 8 | 2 |
| on 200 | 49 | 75 | 41 | 14 |
| thru 200 | 0 | 2 | 51 | 84 |
| Bulk Density | 0.43 | 0.43 | 0.66 | 0.50 |
| Solution Clarity, 20% in MEK | clear | clear | gel and haze | clear |
| Brookfield Viscosity, 20% in MEK | 52 | 66 | 108 | 61 |
| Flow at 145° C. (in.²) | 10.4 | 7.9 | 7.7 | 9.6 |
| Flow at 165° C. (in.²) | 18.7 | 15.3 | 15.5 | 17.0 |

These results show that the use of lactam copolymer colloid provides suspension polymers having properties essentially equal to those exhibited by solution polymers and that a conventional colloid, polyvinyl alcohol, is not satisfactory.

Adhesion tests were conducted on the above polymer, runs A and B, and compared with a polymer (D) made by the solvent process. Samples of these materials were cast on tin plates free of grease and fused at 300° F. for 15 minutes. The polymers (A and B) prepared according to this invention showed as good adhesion as the solution polymer. Samples of the polymers were also cast on glass, removed, dried at room temperature for 15 minutes and then oven dried at 250° F. for 30 minutes. These sample films of polymers of the present invention and those from solution polymers after immersion in water at room temperature for one week showed no blushing. Moreover, when the same samples were aged in water for 45 minutes at 170° F., the films of the polymers of the present invention showed no blushing while a film made from the solution polymer showed fair blushing.

EXAMPLE II

The method of this example was the same as runs A and B of Example I, above, except that the lactam colloid copolymer was increased to one part. The reaction was allowed to proceed for 15 hours. The resulting polymer after removal of water was in the form of very fine particles which would readily dissolve (20% by weight) in 50–50 methyl ethyl ketone-toluene solvent mixture to give clear haze-free and gel-free solutions.

*Example III*

The method of this example was the same as Example II, above, except that the colloid used in one instance was a copolymer of 30% by weight of 1-vinyl-2-pyrrolidone and 70% vinyl acetate (PVP-VA E–535 (K value: 25–35), General Aniline and Film Corp. in 50% anhydrous ethanol) and in another instance it was a copolymer of 70% by weight of 1-vinyl-2-pyrrolidone and 30% vinyl acetate (PVP–VA E–735 (K value: 30–50) General Aniline and Film Corp. in 50% anhydrous ethanol). The resulting polymers exhibited essentially the same properties as those shown for the polymers prepared with the lactam colloid copolymer in Example I.

Example IV

Several runs were made similar to Example II, above, except that in each case the colloid was a 50-50 copolymer of vinyl acetate and (a) 1-vinyl-3-pyrrolidone, (b) 1-vinyl-3-methyl-2-pyrrolidone, (c) 1-vinyl-3-methyl-2-piperidone, (d) 1-methyl-2-allyl-3-piperidone, and (e) 1-vinyl-2-suberone isoxime. In all cases polymers were obtained which gave clear solutions in methyl ethyl ketone-toluene solvent mixtures and exhibited physical properties similar to those of the polymers prepared with the lactam colloid of Example I, above.

Example V

The method of this example was the same as that of Example II, above, except that a homopolymer of 1-vinyl-2-pyrrolidone was used as a colloid. When dissolved in methyl ethyl ketone-toluene solvent mixture, the resulting solution was hazy and bits of gel could be seen.

When fused onto steel plates, pinholes developed in the vinyl coating indicating that the homopolymeric colloid did not fuse due to its high melting point. These results show that homopolyvinyl lactams are not useful colloids in suspension polymerization to obtain the results disclosed herein.

Example VI

The method of this example was similar to that of runs A and B of Example I, above, except that, in place of the vinyl pyrrolidone-vinyl acetate copolymer, various conventional colloid protecting agents were employed such as gelatin, polyacrylamide, hydroxy ethyl cellulose, carboxy methyl cellulose, methyl cellulose, gum arabic and gum tragacanth. When 20% by weight of the polymers obtained were dissolved in 50-50 methyl ethyl ketone-toluene solvent mixtures, the solutions became hazy or gel formed. Hence, these colloids are not useful for making clear and haze free coating compositions and the like.

The method of the present invention is particularly useful in the manufacture of blotter-type resins. Blotter resins have a high plasticizer take-up so that the resin particles remain in the finely divided state or as a powder rather than as a plastisol and which greatly facilitates calendering etc. Blotter resins, also, have a relatively high irreversible plasticizer take-up (IPTU) which refers to the amount of plasticizer that fills the pores and crevices within particles as distinguished from the plasticizer that fills the voids between particles (termed reversible plasticizer take-up) and which can be removed by centrifugation. However, the irreversible plasticizer content cannot be removed even by centrifuging at speeds of the order of 1300 r.p.m.

In making blotter resins the polymerization mixture is polymerized to about 40-50%, many times to only 30%, conversion whereupon the pressure on the mixture is suddenly released to cause blowing, expansion, etc. of the resin particles due to the expansion or volatilization of the monomer in the polymer particles. Conversion cannot be taken to completion due to the increases in particle size and reduction in the amount of monomer which is insufficient to properly blow the polymer particles. Moreover, with conventional colloids it is not usually possible to obtain conversions of above 50% for blotter-type resins.

The process of the present invention, however, can be used to produce blotter-type resins having a relatively high irreversible plasticizer take-up and a satisfactory bulk density so that they can be economically stored, bagged and shipped. The conversion to polymer varies up to 84 to 87% or even up to about 90% and no blowing step is needed. While the polymer particles are apparently not per se porous internally, they have sufficient surface irregularity or each particle is composed of a sufficient number of compacted smaller spherical resin units that the particle retains a substantial portion of plasticizer and acts like a blotter-type resin.

Example VII

Several suspension polymerizations to about 84-87% conversion of vinyl chloride were undertaken at about 122° F. in which the ratio of water to monomer and the agitation (5″-3 blade marine type propeller) were varied. The basic recipe was as follows:

| Material | Parts by Weight | Ratio |
|---|---|---|
| Vinyl chloride, distilled | 100 | 1 |
| Water, deionized | 200 | 2 |
| Lauroyl peroxide | 0.5 | |
| 50-50 1-vinyl-2-Pyrrolidone-vinyl Acetate copolymer Colloid (50% in anhydrous ethanol, PVP-VA E-535 Gen. Anil. & Film) | 1.0 | |

After filtering and drying the polyvinyl-chloride at 140° F. for about 24 hours, the polymer was tested and the results obtained are shown in Table II, below:

TABLE II.—PROPERTIES OF HIGH CONVERSION BLOTTER PVC HOMOPOLYMERS

| Batch Number | Ratio, Water to Monomer | Agitation, r.p.m. | Parts Colloid | Wet Sieve Analysis Retained— | | | | Cold PTU [1] | Irreversible PTU [2] | Bulk Density, gm./cc. | Intrinsic Viscosity, 25° C. |
|---|---|---|---|---|---|---|---|---|---|---|---|
| | | | | On 40 | On 100 | On 200 | thru 200 | | | | |
| | | | | Percent | Percent | Percent | Percent | | | | |
| 1 | 2:1 | 500 | 0.5 | trace | 23 | 70 | 7 | 162 | 46 | 0.39 | 1.059 |
| 2 | 2.5:1 | 500 | 0.5 | trace | 8 | 74 | 18 | 169 | 48 | 0.36 | 1.028 |
| 3 | 2:1 | 500 | 0.25 | 52 | 35 | 11 | 2 | 171 | 56 | 0.36 | 1.137 |
| 4 | 2.5:1 | 400 | 0.5 | 2 | 51 | 47 | 0 | 140 | 48 | 0.41 | 1.137 |
| 5 | 2.5:1 | 300 | 0.5 | 51 | 47 | 2 | 0 | 125 | 48 | 0.42 | 1.107 |
| 6 | 2.5:1 | 400 | 0.25 | 27 | 69 | 3 | 1 | 129 | 48 | 0.44 | 1.153 |

[1] Plasticizer take-up.
[2] Polyvinyl chloride polymerized in aqueous suspension using lauryl peroxide catalyst and 0.1 part methyl cellulose or polyvinyl alcohol at r.p.m. of 106 and 40.1% conversion exhibited after blowing (differential pressure of 57 p.s.i.) an irreversible PTU of 53 and a bulk density of 0.38.

The results shown in Table II above clearly point to the fact the useful and novel blotter-type resins can be produced according to the teaching of the present invention.

It, thus, is seen that copolymers of vinyl pyrrolidone type materials with vinyl acetate are unique when used in the suspension polymerization of vinyl halide polymers.

They provide polymers which have satisfactory viscosity and flow properties and which will form clear and haze free solutions, films and the like as well as blotter-type resins.

Furthermore, it is to be understood that in accordance with the provisions of the patent statutes, the particular form of compositions and products shown and described and the particular procedures set forth are presented for purposes of explanation and illustration and that various modifications of said composition, product and procedure can be made without departing from the invention.

Having thus described the invention, what is claimed is:

1. The method which comprises suspension polymerizing in aqueous media a vinyl halide monomer to at least 30% conversion in the presence of from about 0.01 to 4.0% by weight based on the weight of said monomer of a colloid, said colloid being substantially soluble in water and in organic solvents and being a copolymer of a monoolefinically substituted pyrrolidone having the general formula

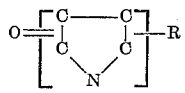

where R is an alkenyl radical having from 2 to 6 carbon atoms and is attached to one of the atoms of the group consisting of C and N of the pyrrolidone ring, O is attached to a carbon atom other than that to which R is attached, and the remaining valences on the carbon and nitrogen atoms are satisfied by radicals selected from the group consisting of hydrogen and the lower alkyl radicals and mixtures thereof, with vinyl acetate, the relative mole ratio of said pyrrolidone to said copolymerized vinyl acetate monomer being about 1.0:0.2 to .2:1.4.

2. The method which comprises suspension polymerizing in aqueous media a vinyl halide monomer to at least 30% conversion in the presence of from about 0.1 to 2.0% by weight based on the weight of said monomer of a protective colloid substantially soluble in water and in aliphatic ketone and aromatic hydrocarbon solvents, said colloid being a copolymer of from about 70 to 30% by weight of vinyl pyrrolidone and 30 to 70% by weight of vinyl acetate.

3. The method according to claim 2 where said monomer is vinyl chloride.

4. A method which comprises subjecting to polymerizing conditions in aqueous media a vinyl halide monomer in the presence of .01 to 4.0% by weight of said monomer of a copolymer of vinyl acetate and a monoolefinically substituted lactam having 4 to 7 carbon atoms in the lactam ring until at least 30% of said monomer is converted to a vinyl halide polymer, said vinyl acetate-lactam copolymer being substantially soluble in water and in organic solvents.

5. The method of claim 4 in which the vinyl halide is vinyl chloride.

6. The method of claim 1 in which a minor amount of vinyl acetate monomer is present and a vinyl halide-vinyl acetate copolymer is formed.

7. The method of claim 2 in which the vinyl halide monomer is vinyl chloride, a minor amount of vinyl acetate monomer is present, and a vinyl chloride-vinyl acetate copolymer is formed.

8. A suspension polymerized vinyl halide polymer containing from about 0.01 to 4.0% by weight based on the weight of said polymer of a copolymer of vinyl acetate and a monoolenically substituted lactam having from 4 to 7 carbon atoms in the lactam ring, said vinyl acetate-lactam copolymer being substantially soluble in water and inorganic solvents.

9. A suspension polymerized vinyl halide polymer according to claim 8 in which said lactam is a pyrrolidone having the formula

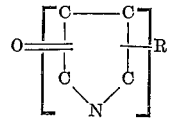

where R is an alkenyl radical having from 2 to 6 carbon atoms and is attached to one of the atoms of the group consisting of C and N of the pyrrolidone ring, O is attached to a carbon atom other than that to which R is attached, and the remaining valences on the carbon and nitrogen atoms are satisfied by radicals selected from the group consisting of hydrogen and the lower alkyl radicals and mixtures thereof, the relative mole ratio of said pyrrolidone to said vinyl acetate being from about 1.0:0.2 to 0.2:1.4.

10. A suspension polymerized vinyl halide polymer according to claim 9 where said pyrrolidone is 1-vinyl-2-pyrrolidone, and the percent by weight ratio of said pyrrolidone to said vinyl acetate is from 70:30 to 30:70.

11. A suspension polymerized vinyl halide polymer according to claim 10 where said copolymer of said pyrrolidone and said vinyl acetate is present in an amount of about 0.1 to 2.0% by weight based on the weight of said vinyl halide polymer.

12. A suspension polymerized vinyl halide polymer according to claim 11 where said vinyl halide polymer is a vinyl chloride polymer.

13. A suspension polymerized vinyl halide polymer according to claim 11 where said vinyl halide polymer is a polymer of vinyl chloride containing a minor amount of vinyl acetate copolymerized therewith.

References Cited in the file of this patent

UNITED STATES PATENTS

| | | |
|---|---|---|
| 2,888,410 | Buchholz | May 26, 1959 |
| 2,890,199 | McNulty et al. | June 9, 1959 |